United States Patent [19]

Nowisch

[11] 4,422,588

[45] Dec. 27, 1983

[54] SLITTER-REWINDER SYSTEM

[75] Inventor: Heinz K. Nowisch, Fulton, N.Y.

[73] Assignee: The Black Clawson Company, Middletown, Ohio

[21] Appl. No.: 305,821

[22] Filed: Sep. 28, 1981

[51] Int. Cl.³ .................... B65H 19/00; B65H 35/02; B65H 37/02; B32B 31/18

[52] U.S. Cl. ................................ 242/56.3; 242/56 R; 242/66; 156/259; 156/517

[58] Field of Search .................. 242/56 R, 56 B, 56.2, 242/56.6, 56.3, 56.9, 65, 66; 156/187, 259, 264, 517

[56] References Cited

U.S. PATENT DOCUMENTS

| | | | |
|---|---|---|---|
| 1,687,938 | 10/1928 | Johnstone | 242/56.9 R |
| 2,366,999 | 1/1945 | Campbell | 242/56.6 |
| 2,845,231 | 7/1958 | Grettve | 242/56.6 |
| 2,950,875 | 8/1960 | Dain | 242/66 |
| 3,282,524 | 11/1966 | Couzens | 242/56 R |
| 3,365,992 | 1/1968 | Dreher | 242/56 R |
| 3,633,839 | 1/1972 | Clark | 242/56 R |
| 3,820,446 | 6/1974 | Granbon | 92/88 |
| 4,092,886 | 6/1978 | Nowisch | 83/56 |
| 4,370,193 | 1/1983 | Knouthe | 156/446 |

FOREIGN PATENT DOCUMENTS

| | | | |
|---|---|---|---|
| 2918821 | 11/1980 | Fed. Rep. of Germany | 242/56 R |

*Primary Examiner*—Stuart S. Levy
*Assistant Examiner*—Lloyd D. Doigan
*Attorney, Agent, or Firm*—Biebel, French & Nauman

[57] ABSTRACT

A system and method for slitting and rewinding includes a slitter and a drum type rewinder. A core cutter includes a magazine for retaining a plurality of cores and a programmable transversely movable core slitter which may be moved to discrete transverse locations for severing a selected core into widths corresponding to the setting of the slitter knives. A core transporter receives the sections of slit core and transports the same to the winder drums while, at the same time, moves the completed roll out of winding position. A web severing and adhesive applying apparatus cuts the web from the winder and applies strips of adhesive to the tail and lead edges of the back. The core sections as formed by the core slitting or sectioning apparatus, are maintained in predetermined alignment according to the position of the knives and are inserted into the winder by the transporter behind the previously formed roll as the roll is moved out of the winder, resulting in a minimum of lost time or wasted material. The system is capable of fully automatic operation without the necessity of core handling, slitting, core placement, or web attachment thereto by an operator.

12 Claims, 8 Drawing Figures

SLITTER-REWINDER SYSTEM

BACKGROUND OF THE INVENTION

This invention relates to automatic slitter winders or rewinders, and more particularly to a system and method which include a slitter and a core cutter, in combination with a winder. The system and method also includes a roll ejector and web severing, transferring and attaching equipment.

Although programmable or computer controlled slitters are known, it has been necessary to sever or cut the cores for the winder into individual sections corresponding to the transverse widths of the individual webs from the slitter, by hand or by hand controlled apparatus. Often such core segments or sections must then be loaded by hand into a winder for the attachment of the free ends of the web and for winding thereon from the slitter. Automatic core loading into a winder is also known, but in such circumstances it has nevertheless been necessary to sever the core into individual sections, by hand or by a hand operation, and then place the core sections into a loader so that their ends correspond to the transverse positions of the slitter knives. There accordingly exists a need for a system of core cutting, roll removal, core loading, and web severing and attachment to new core sections which reduces or eliminates the necessity for the operator himself to perform one or more of these duties on each roll set.

SUMMARY OF THE INVENTION

The invention is directed to a slitter-rewinder system, the apparatus making up such a system, and the method of slitting and rewinding a web. The equipment includes a programmable core cutter by which a core may be cut in accordance with the set-up of a slitter, in which a core cutter is positioned in relationship to the positions of the slitter knives. A core is cut into individual core sections which are equal to the widths of the several bands or sections of the web to be cut by the slitter knives. The same data or information for setting up the slitter may be used for programming the core cutter. The core cutting apparatus has a magazine for containing a quantity of cores. The cores are released from the magazine one at a time into a cutting station where a transversely controllable cutter may be moved in accordance with the position of the slitter knives and operated to sever the core. Various methods of cutting or separation may be used, preferably ones which are dust free, including water jet, laser beam, hot wire, rotating knife or saw.

A core transporter loads a surface-type winder or drum-type winder with a sectioned or slit core before the previously wound roll is fully or completely removed out of the winding station. The core sections are located or positioned in place from the rear of the winder, that is, from the lead-in side as distinguished from the front of the winder.

The core transporter also includes a roll ejector. The transporter moves the slit core sections from the cutting station and places these core sections between the pair of winding drums and just after the previously wound roll is moved out of the winding position.

The system also includes apparatus for severing a web at the conclusion of winding and for applying an adhesive to both tail ends or transverse edges of the severed web, transferring one edge to the aligned core sections and tacking the other end of against the surface of the wound roll.

An important advantage of the present invention resides in time saving, in that it is not necessary to handle the core sections individually. Greater accuracy in core sectioning is obtainable, since the core cutting may be programmed the same as that of the slitter knives.

Time is saved by the ability of the apparatus to insert a sectioned core into the winder drums immediately after having removed the previously wound roll therefrom, by a roll ejector which also includes a core inserter or core transfer apparatus. Safety is enhanced by reducing the number of operations which an operator must perform at the machine.

It is accordingly a primary object of this invention to provide slitter rewinder system and supporting apparatus in which a core is sectioned, corresponding to the spacings of slitter knives, and the core sections are thereafter automatically handled as a unit without disturbing their predetermined alignment or position, and automatically loaded into a winder.

A still further object of the invention is the provision of apparatus which includes a core cutter, a roll ejector and core insertion device, and in novel and automatic web severing and taping equipment.

Another important object of the invention is to provide apparatus by means of which a core may be slit into several sections corresponding to the settings of a slitter, the finished roll removed, the core sections loaded, and the web severed from the finished roll and attached to the core sections, which system eliminates the former necessity for the operator to perform one or more of these tasks individually, with improved machine efficiency and safety.

A further object of the invention is the provision of web severing apparatus, incorporating an adhesive applicator which applies an adhesive to the web at either side of the line of severance, so that the tail of the web may be attached to the finished roll and the leading edge of the web may be attached to a core or to core sections. Such apparatus in accordance with the present invention further includes web control means through which the movement of the free ends of the web are effected to apply the same to the core or core sections. Preferably the web severing apparatus includes tape dispensers as the adhesive applicator, although it is within the scope of the invention to use other forms of adhesive applicators such as glue guns, sprays, hot melts, staples or the like.

A still further object of the invention is the provision of core slitting apparatus which is programmable or movable transversely of the web in accordance with predetermined positions and accurately positionable to slit or cut the core into individual core sections, as desired.

Another object of the invention is the provision of transporter mechanism by means of which the severed core sections are moved into winding position on a winder while maintaining the relative position of the core sections.

These and other objects and advantages of the invention will be apparent from the following description, the accompanying drawings, and the appended claims.

DESCRIPTION OF PREFERRED EMBODIMENT

The slitter rewinder system may be considered as being made up of certain primary operative sections or components. Thus, Roman numeral I generally represents a position controlled slitter section which includes a plurality or multiple number of rotary shear or slitter knives movable to selectable transversely located positions to cut a moving web 10, such as a moving web of paper, into sections or bands of material of discrete width, for rewinding.

Roman numeral II designates a core cutter which includes a magazine containing a batch or quantity of cores, which cores are released one at a time into a cradle formed by two driven rollers where the core is severed into individual sections in accordance with the position of the slitter knives. The core sections which are formed have lengths equal to the widths of the respective bands formed by the slitter section.

Roman numeral III designates a core transporter and roll ejector which receives and carries the core sections, as a unit, for placement in the cradle of a pair of winding drums and which also includes provision for moving a previously wound roll out of its winding position on the drums.

Roman numeral IV designates a web severing and taping section by means of which the web is severed, after winding, and an adhesive such as tape strips of some type of adhesive is applied to the leading and trailing edges. This section also includes control means so that the leading edge may be applied to the newly placed core sections and the trailing edge may be tacked to the finished roll. The web severing and taping section IV includes a cross cut knife for severing the web, dispensers for applying adhesive to the web, and web transfer means, such as a blow tube, for controlling the movement of the free ends of the web for attachment to the newly placed core sections for winding a new roll. Roman numeral V refers to a drum-type surface winder.

Slitter Section I

Figure 1:
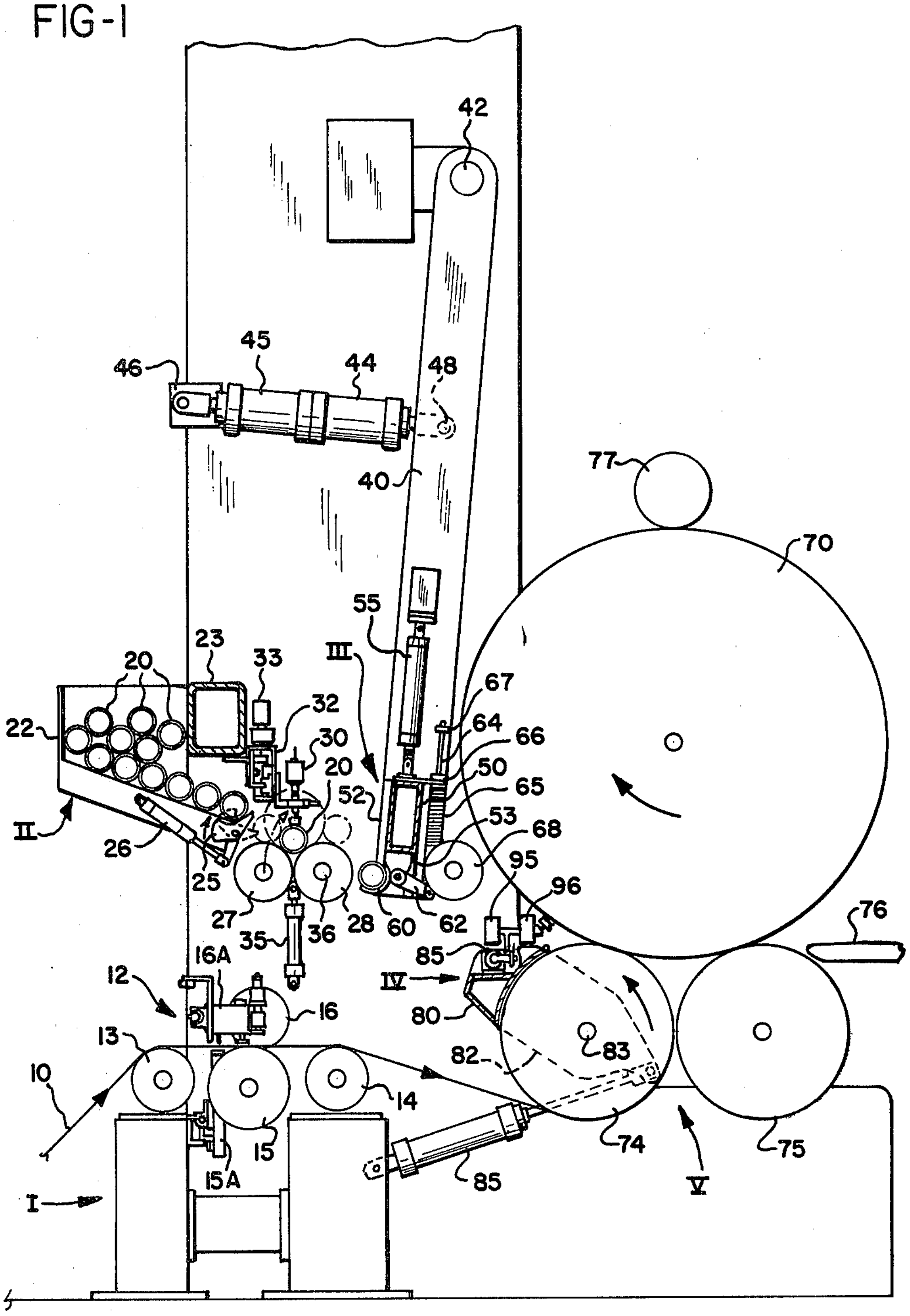
FIG. 1 illustrates the preferred embodiment of the invention in a first stage of operation.
Figure 2:
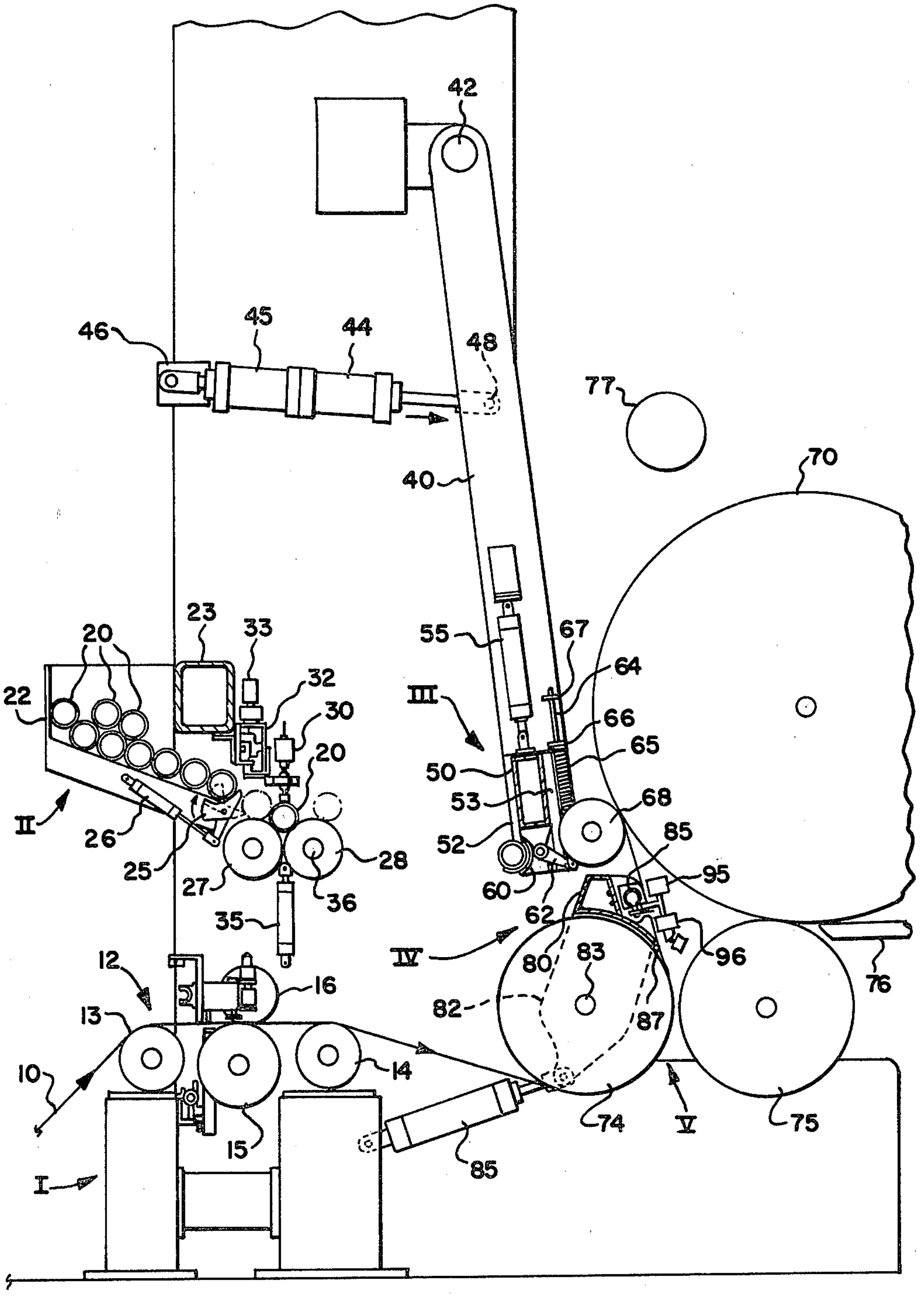
FIG. 2 illustrates the invention in a second stage of operation.
Figure 3:
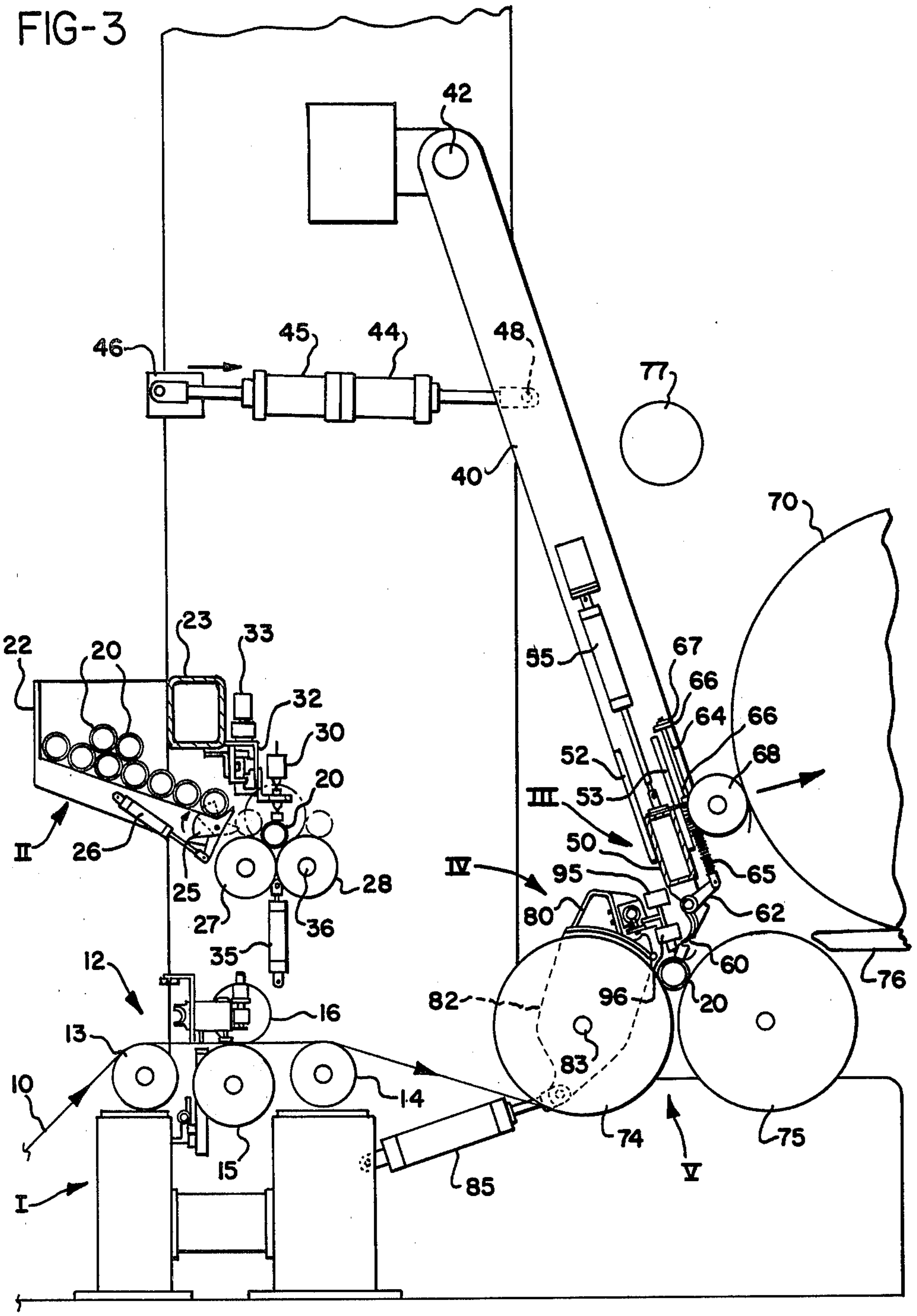
FIG. 3 illustrates the invention in a third stage of operation.

The system of the present invention may employ any kind of a slitter desired. Advantageously, the slitter designated by the Roman numeral I may be of the programmable type by which the position of the slitter knives may be preselected in accordance with a known computer program to provide individual bands or widths of the web 10. As shown in FIGS. 1–3, a slitter 12 is illustrated which includes a pair of guide rolls 13 and 14 which guide the web 10 through one or more rotating slitter shear knives, as illustrated by the lower knife 15 and the upper knife 16. The knives 15 and 16 are mounted on a suitable transversing and clamping mechanism illustrated respectively at 15*a* and 16*a* in FIG. 1. The mechanical details of the slitter section I may be as disclosed in my U.S. Pat. No. 4,092,886 issued June 6, 1978 and assigned to the same assignee as this invention.

Core Cutter Section II

Referring to FIGS. 1–3, a core cutter is provided by means of which a core 20 may be selected from a magazine of cores, one at a time, placed in a cutting station, and severed in accordance with the knife settings of the slitter, for the purpose of dividing a core 20 into longitudinal, axially aligned core segments which correspond in number and in width to the corresponding number and width of the web sections formed by the slitter 12. A plurality of the cores 20 are retained in a magazine 22 mounted in turn on a cross beam 23. The magazine 22 has a sloping gravity-feed bottom. Means for selecting one core at a time is provided by a latch 25 at the lower end of the magazine. The latch engages a single core and is movable by an air cylinder 26 to flip the core into the cradle defined between a pair of rotating rolls 27 and 28. The rotating rolls provide means for defining a cutting station for supporting and cradling a core 20 while the same is being severed or divided into segments.

The core cutting section II includes a suitable core cutting device which is illustrated as a high pressure water jet cutter nozzle 30, although it should be understood that a saw, a laser beam, hot wire or other suitable cutter may be used. It is preferred to use a cutter which is as dust free as practical and the high pressure nozzle cutter is effective and dust free. The cutter nozzle 30 is moved along the beam 23 to discrete positions by a sliding carriage 32, driven in positive increments by a gear motor 33, the position of which is sensed by an encoder 34 (FIG. 7).

Figure 7:
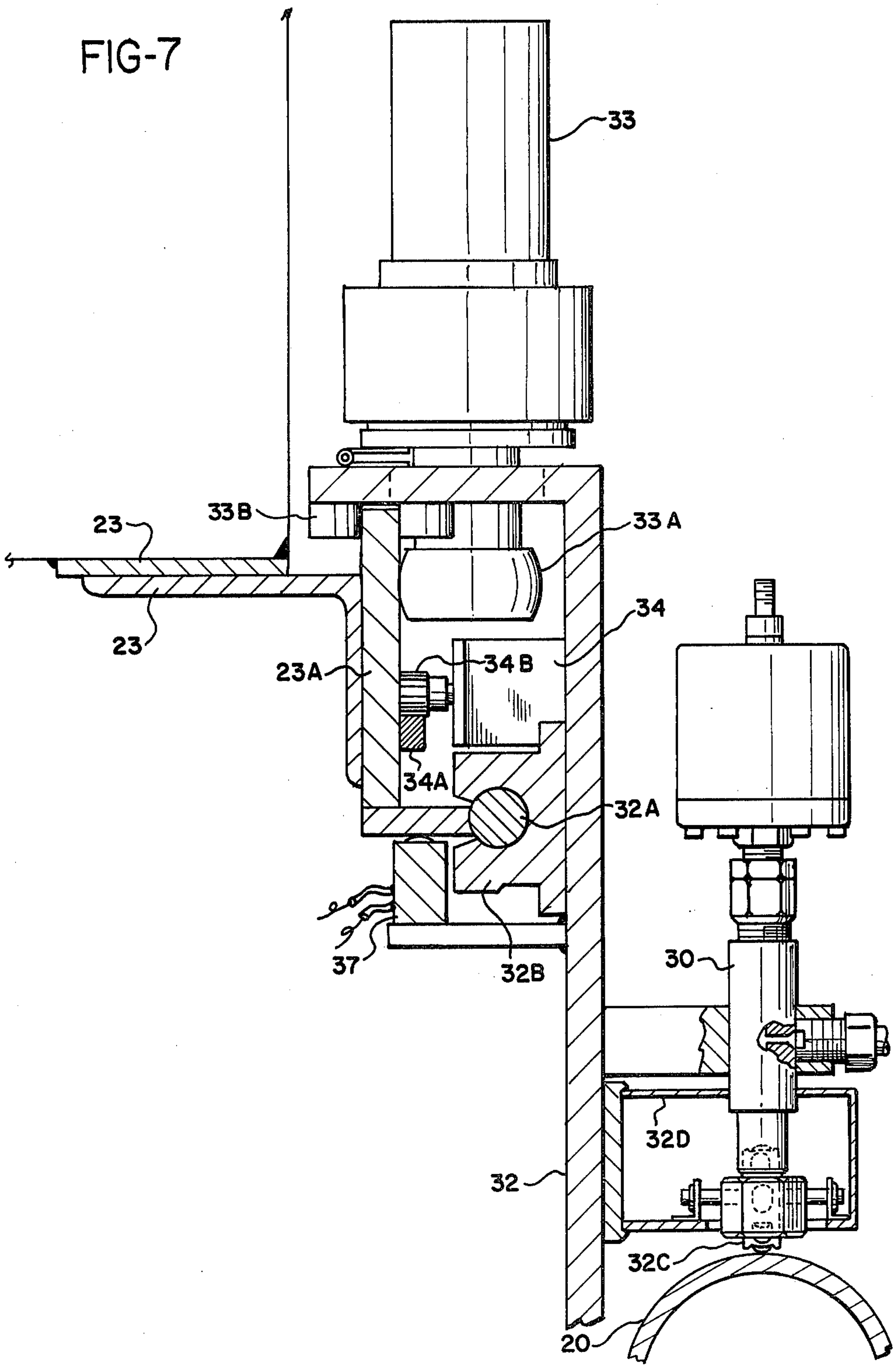
FIG. 7 is an enlarged sectional view through the core cutting mechanism showing certain parts in elevation.

Reference may be had to FIG. 7 showing an enlarged fragmentary cross-section through a portion of the core cutter section II. The carriage 32 is shown mounted on the beam 23 and guided for transverse movement by a rod 32*a* on an open sided ball bushing pillow block 32*b*. The encoder 34 provides a signal representing or corresponding to the transverse position of the nozzle 30, and may operated from a rack gear 34*a* and a pinion 34*b* as shown in FIG. 7. The gear motor 33 may drive the carriage 32 by means of a rubber covered drive roller 33*a* which engages a stationary horizontal rail 23*a* forming part of the support beam structure and guided thereon between a pair of rollers 33*b*. A holding brake 37, such as a solenoid, an electromagnetic latch or the like, is provided for retaining the carriage 32 supporting the nozzle 30 in any preselected position.

The cutter nozzle 30 as illustrated in FIG. 7, controllably directs a stream of very high pressure cutting liquid, such as water, onto the surface of an underlying core 20 to severe the core while the same is slowly rotated on the rolls 27 and 28. It is understood that the invention is not limited to the use of a particular water jet cutting nozzle of the type illustrated, but this nozzle is of particular advantage and is of the type used in the corrugated board industry for a number of years for cutting corrugated board by a high pressure narrowly directed water jet. The cutting process uses very little water, and cuts at high speed without delaminating or shredding the remaining wall of the core, produces a minimum of dust, and provides a high quality edge to the individual core segments. A suitable high pressure cutting nozzle system is sold by Flow Industries, Inc. of 21414 Sixty-Eight Avenue South, Kent, Wash. 98031 under the trade name "Waterknife." It may be advantageous to hold the core 20 down in its cradled position between the rolls 27 and 28 to assure the maintenance of a proper distance between the jet from the nozzle 30 and the surface of the core, and also for the purpose of overcoming a curved or bent core. For this purpose, the carriage 32, adjacent the nozzle 30, may be provided with a "Transwheel" two-way roller 32_c_ mounted on a bracket 32_d_ to engage the upper surface of the core 20. The roller 32_c_ permits the nozzle to be traversed longitudinally of the core and also permits the core 20 to be rotated while cutting.

After the core slitting has been accomplished by suitably activating the nozzle 30 at each discrete location along the length of the core corresponding to the position of the slitting knives 15 and 16, the motor 33 may be activated to transport the carriage 32 and the associated cutting nozzle 30 out of operative position. The pair of rolls 27 and 28 are mounted on arms, not shown, which are pivotally movable by a cylinder 35 about the axis 36 of the roll 28 to the dotted or broken line position of the roll 27, as shown in FIG. 1. In this position, the individual segments of the core 20 now roll over the roll 28 and drop into the transporter section.

Core Transporter and Roll Ejector III

The transporter section III is in the retracted position shown in FIG. 1. The transporter includes one arm 40 on each side of the winder. Each arm 40 is mounted for pivotal movement about a pivot 42 and is operated by a pair of back-to-back hydraulic cylinders 44 and 45. The rod of cylinder 45 is connected to the frame at 46 while the rod of cylinder 44 is connected to the arm 40 at pivot 48. The lower end of the arms 40 support a transverse cross beam 50 which is mounted for limited vertical movement between a pair of vertical gibs or guides 52 and 53 on the arms 40. The vertical movement of the cross beam 50 between the arms is controlled by a pair of air cylinders 55 (only one shown). The lower end of the beam 50 pivotally supports and an upwardly opening cradle or trough 60 which is positioned, as shown in FIG. 1, to receive the core segments as they are rolled over the peak of the roll 28. These segments fall directly into the trough 60 and their lateral positions are maintained. The beam 50 is shown in a raised or lifted position in FIG. 1 and is movable by the cylinders 55 into a lowered or ejecting position as shown in FIG. 3 by movement between the guides 52 and 53. The trough 60 is pivotally mounted and movable by an arm 62 connected to a rod 64 carrying a compression spring 65. The upper end of the rod is positioned above a stop 66 and carries a washer 67, so that lowering movement of the cross beam 50 is accomplished first by the compression of the spring 65 and thereafter by the engagement of the washer 67 with the stop 66, causing the trough 60 to be pivoted by the arm 62 so as to discharge the core segments into the winder. The core transporter and roll ejector further includes a transverse ejector bar 68 which normally clears a previously wound roll 70 in the winder, as shown in FIG. 1, and which is movable by extension of the rod of the hydraulic cylinder 44, as shown in FIG. 2, to move a completed roll 70 out of winding position.

Winder V

The winder section V includes a pair of spaced winder drums 74 and 75, and a slightly inclined roll-receiving ramp 76 above the drum 75, all of which may be constructed essentially as shown in the patent of Dain et al., U.S. Pat. No. 2,950,875 issued Aug. 30, 1960. In the illustration of FIG. 1, a roll 70 has been wound on the drums 74 and 75 substantially to its maximum diameter, in contact with a rider roll 77, and is ready to be moved out of winding position by the bar 68, essentially as illustrated in FIG. 2, and then has its web severed and the ends thereof taped by the web severing and taping section IV.

Web Severing & Taping Section IV

Figure 4:
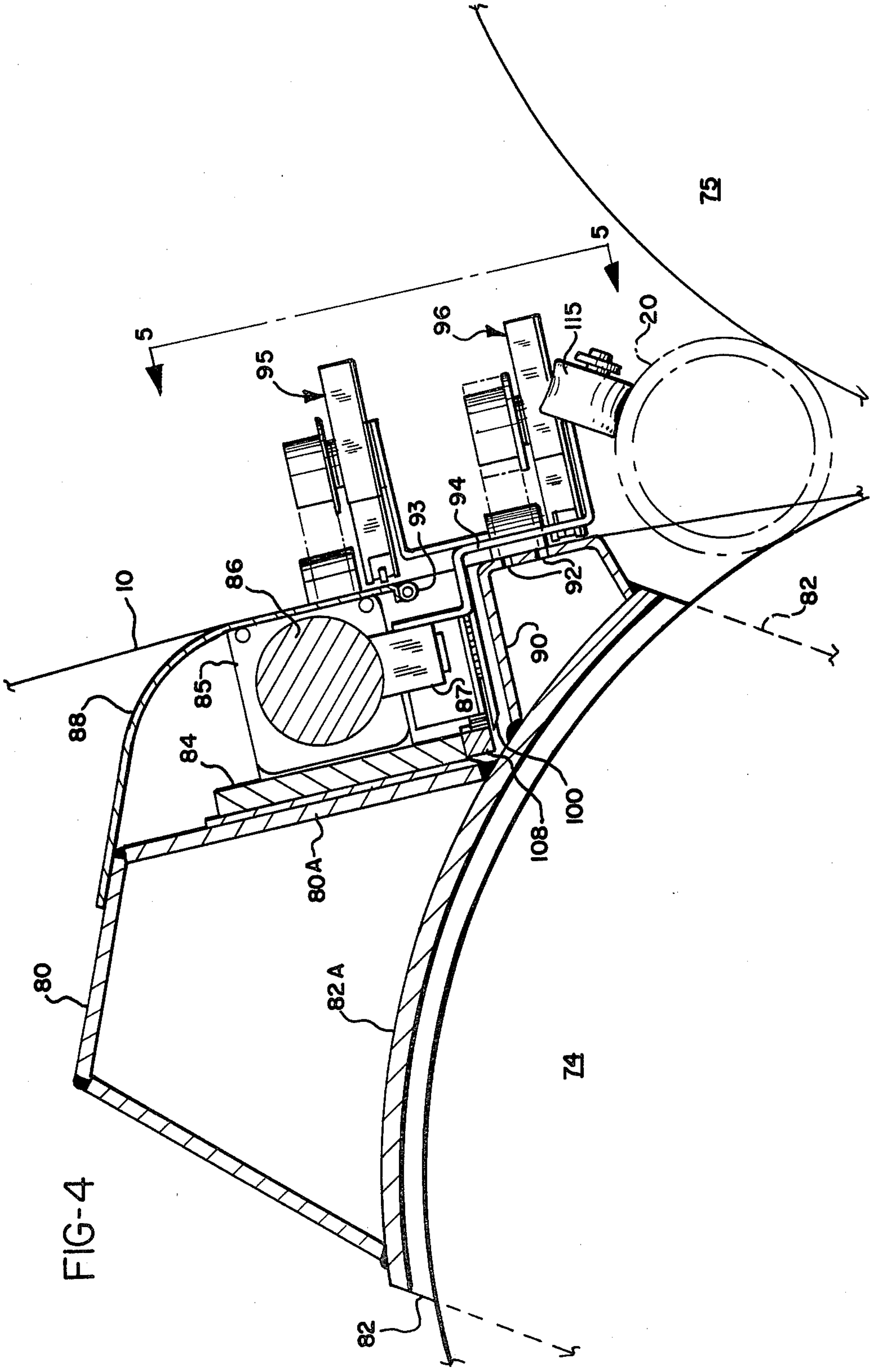
FIG. 4 is an enlarged transverse section through the web severing and taping mechanism showing certain parts in elevation.

The web severing and taping section IV, previously indentified, provides for the severing or cutting of the web 10 at the completion of the winding of the roll 70, and also provides for the application of a suitable adhesive, such as a two-sided tape, to the web adjacent the cut edges thereof. Preferably, an adhesive is applied to the tail end of the web so that the same may be tacked to the completed roll and, at the same time, an adhesive is applied to the free end of the web so that the same may be applied to the core prior to winding a new roll. The Section IV thus includes means for severing the web, means for applying adhesive to the edges thereof, and further includes means for attaching the free end of the web to the newly sectioned core. As shown in FIGS. 1–3, a cross machine support beam or frame member 80, including the web severing and taping apparatus supported thereof, is mounted on a pair of support arms, positioned at the opposite ends of the machine, as illustrated by the arm 82 seen in FIG. 1. The arm 82 is mounted about a pivotal center 83 which coincides with the center of rotation of the drum 74, and the arm and attached web severing and taping mechanism is movable between a generally retracted or inoperative position by a cylinder 85, as shown in FIG. 1, to its operative position as shown in FIGS. 2 and 3. The mechanism comprising the web severing and taping section is illustrated in greater detail in FIGS. 4–6. Referring to FIG. 4, the beam 80 is shown as being of generally trapezoidal cross-section, mounted an end 82_a_ of the arm 82. A forward wall 80_a_ supports a plate 84 which, in turn, supports means for traversing the cutting and taping apparatus. This means may, for example, comprise a rodless air cylinder 85 containing a movable piston 86 which has a support portion 87 extending outwardly through an axially elongated slot formed in the cylinder 85. A suitable rodless air cylinder for this purpose may be an Origa model P120S/20 sold in the United States by Trol-Mation, Inc., Syracuse, N.Y. and described in U.S. Pat. No. 3,820,446 issued June 28, 1974. It is to be understood, however, that this apparatus is not limited to the use of a particular form of transverse transporting mechanism and other suitable mechanisms such as conventional air cylinders, drive screws, linear motors or the like may be used in place of the rodless air cylinder 85.

A curved guard and drag board 88 extends between the beam 80 and the cylinder 85 to form an upper guide surface for the web. An underlying transverse suction box 90 is provided with suction holes 92 in an outer face thereof, generally in the same plane as the portion of the guard overlying the cylinder 85 and parallel to the line of movement of the web 10, by means of which the web may be temporarily held or clamped while cutting and applying the adhesive. Also illustrated in FIG. 4 is a transversely oriented blow tube 93 positioned at the lower end of the guard and parallel to the cylinder 85. The blow tube 93 has the function of causing the cut and free end of the web 10, to which an adhesive has been applied, to wrap about the outer surface of a newly placed core illustrated in phantom in FIG. 4.

Figure 5:
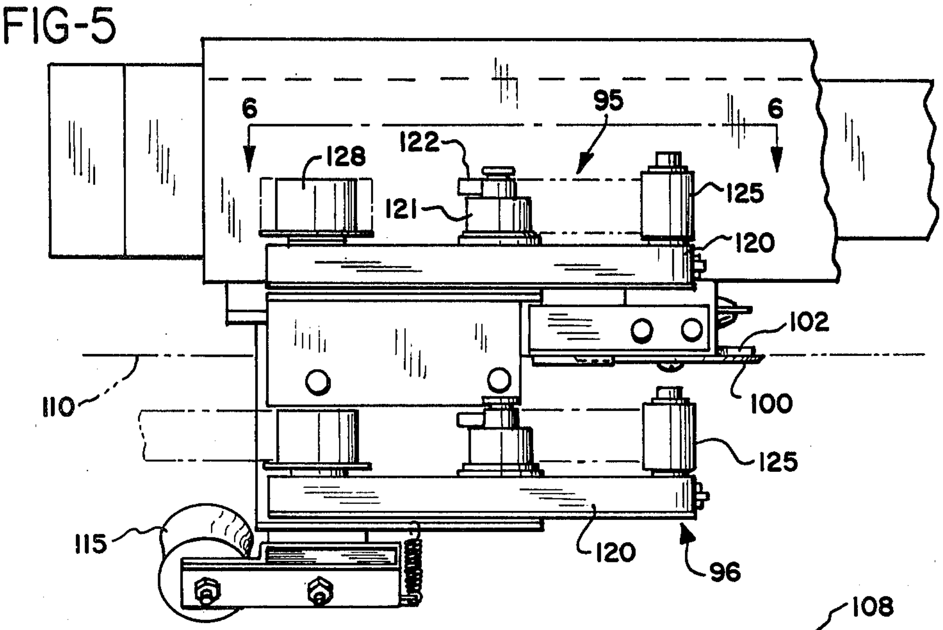
FIG. 5 is an elevational view looking generally along the line 5—5 of FIG. 4.
Figure 6:
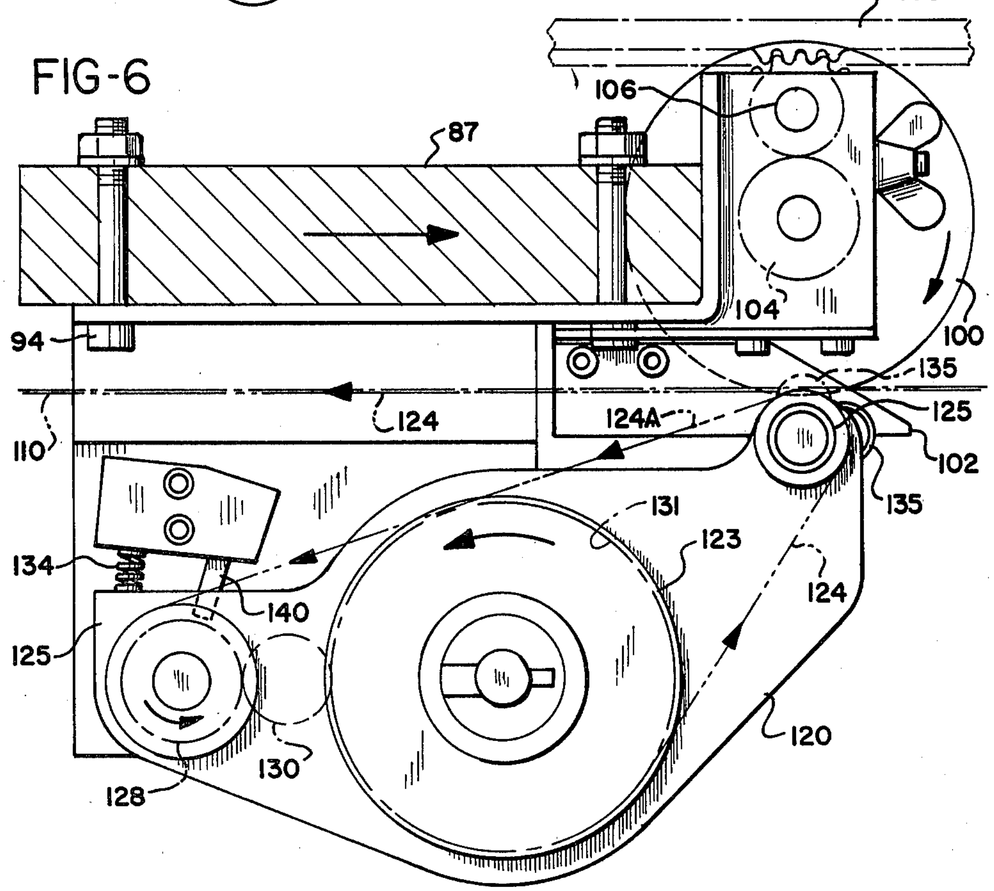
FIG. 6 is a plan view, partially in section, taken generally along the line 6—6 of FIG. 5.

The cylinder extension or support portion 87 of the rodless air cylinder 85 supports a carriage 94 on which is mounted a pair of substantially identical adhesive applicators 95 and 96, shown in end elevation in FIG. 4. The carriage also supports a gear driven rotary knife 100 as best seen in FIGS. 5 and 6 which knife cooperates with a stationary blade knife 102 which forms a close running fit with the rotary knife 100. The rotary knife 100, as best seen in FIG. 6, has a spur gear 104 thereon driven by an intermediate drive gear 106 riding on a stationary transversely elongated rack 108. The rack 108 is also shown in FIG. 4 as being mounted or fixed to the bottom surface of the plate 83.

The pair of tape dispensers or adhesive applicators 95 and 96 are positiond respectively above and below the line of severance or web cutting line 110 so that the upper dispenser 95 is positioned to apply its two-sided tape to the inside surface of the tail of the web, above the cut line 110, while the lower dispenser 96 applies a strip of two sided tape to the free end of the web below the cut line 110. In addition, the dispenser 96 supports a spring-loaded applicator roller 115 by means of which the tape applied by the dispenser 96, upon the return movement of the carriage 94, is rolled into adhesive contact with a freshly prepared core 20, as will hereinafter be described in greater detail.

As previously noted, the tape dispensers 95 and 96 are of essentially identical construction, and their construction and operation may best be understood by reference to FIGS. 5 and 6. The dispensers include a main housing or body 120 which contains the gearing and clutch mechanism for the drive of the take-up reel and which supports the roller shafts. This includes a main supply shaft 121 with a roll keeper 122 thereon to contain and support a supply or roll 123 of two-sided tape wound on a tape liner. For the purpose of illustration, the spool 123 of tape is not illustrated in FIG. 5, but is shown in FIG. 6. The tape 124 leading from the spool 123 is brought over an applicator roll 125, and the liner **124*a* leading from the applicator roll 125 is wound on a liner take-up spool 128. The take-up spool 128 is driven through a slip clutch arrangement by an intermediate drive gear illustrated at 130 in FIG. 6, contained within the housing 120, from a main drive gear 131 which turns with the main supply or spool mounted on the shaft 121**.

The applicator roller 125 is positioned closely approximate the position of the web cut line 110 in the normal operating position of the dispenser.

The main body or housing 120 itself is mounted for limited pivotal movement about the axis of the center roll 121, and a pressure or compression spring 134 bears down on the housing 120 causing the applicator roller 125 to be lifted up so as to be in contact with a web at the cut line 110. A small over-center toggle roll 135 is also pivotally mounted on the housing 120 and normally assumes the full line position as shown in FIG. 6. When the carriage 90 approaches the edge of the lock, the roller 125 engages a rail (not shown) causing clockwise movement of the housing 120. This causes a stop pin 140 to move into engagement with the liner take-up gear 130. Now the take-up roll is locked, and the tape will be torn off with continued movement of the carriage beyond the web area to the end of the stroke of the air cylinder.

When the carriage has reached its limit of travel as defined by the limit of movement of the air cylinder, the two-position toggle roller 135 is caused to be flipped up to its upper or raised position as shown by the broken lines in FIG. 6 and it is retained in this position when the carriage is retracted back to its starting position and in this position provides a lifting force on the web preventing re-engagement of the web with the adhesive on the applicator roller 125. The roller 125 is reset to its full line position when the cutter and tape dispensers are at their rest or home position. Prior to the return movement, the sectioned core has been placed between the winding drums 74 and 75 as shown in phantom in FIG. 4, air is applied under pressure to the blow tube 93, causing the free end of the web 120 to be deflected, with the tape applied thereto, from the applicator 96, in contact with the outer surface of the core, and the taped section is now engaged during the return movement of the carriage by the spring-loaded wheel 115, and pressed against the outer surface of the core.

Modification of Section II

Figure 8:
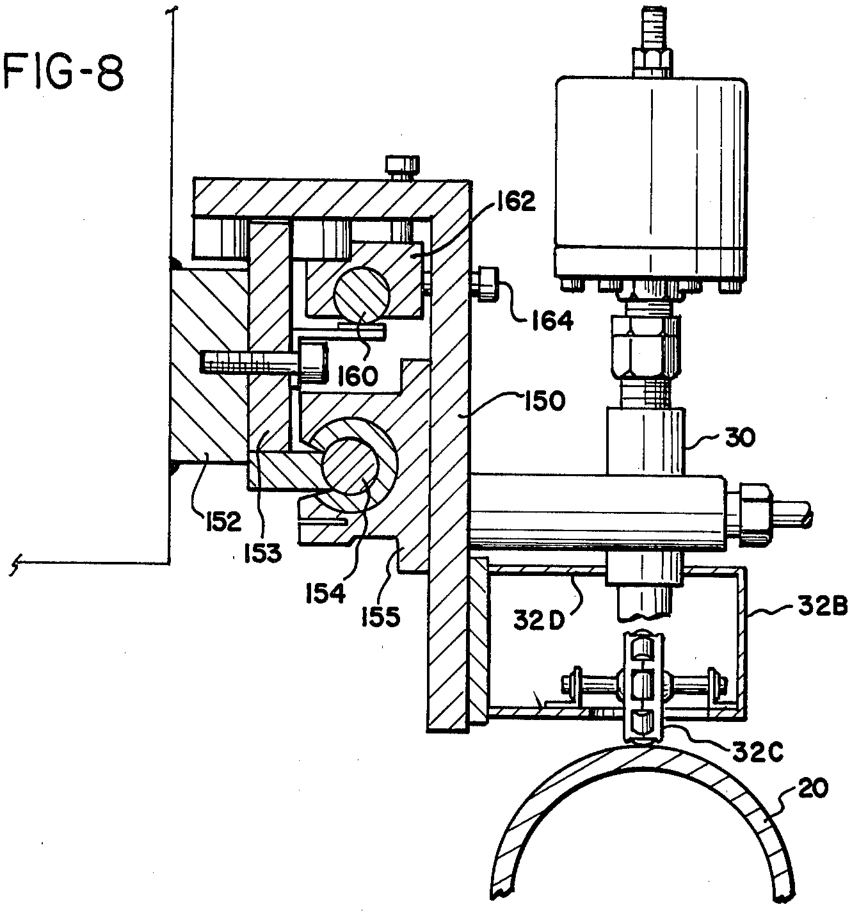
FIG. 8 is a view similar to FIG. 7 of a modified form of a core cutting mechanism.

In FIG. 8 there is illustrated a somewhat modified form of the apparatus shown in FIG. 7. It should be pointed out that it is not necessary to use any particular kind of motivating apparatus for moving the carriage 32 into selected transverse positions for carrying the core slitter, in this instance a water jet nozzle, to selected positions. Thus, in FIG. 8, a generally inverted L-shaped carriage 150 is mounted on a cross beam 152 for translational movement in which a transversely oriented plate 153 carries a rod 154 received within an open-sided ball bushing block 155, which block may be identical to the block **32*a* previously described. However, in this instance the gear motor 33 and associated drive roller 33*a*, as well as the encoder 34 is replaced by a lead screw 160 rotating in a nut 162, the nut being suitably secured by postioning bolts 164 to the carriage 150. The movement of the carriage or frame 150 is thus effected by rotating a lead screw 160 and the extent of rotation and accordingly the position of the carraige 150 may be determined by a suitable counter (not shown) driven with the lead screw 160. Further, in the embodiment of FIG. 8, there is no necessity for applying a braking force by a solenoid since the termination of the rotation of the lead screw and the structural arrangement of the lead screw 160 in the drive nut 162** are sufficient to lock the carriage into any preselected position.

Description of Overall Operation

The description of the operation of the system begins with FIG. 1 which shows a roll 70 being wound, nearing the completion of the winding of this roll. While the roll 70 is being wound, the nozzle 30 of the core cutting section II has been moved to transverse positions, corresponding to the relative positions of the slitter knives. The transverse movement is under the control of the gear motor 33 by driving the rubber covered drive roller **33*a* or the lead screw 160 of FIG. 8, causing the carriage 32 (or 150 of FIG. 8) and the supporting solenoid operated nozzle 30 to be positioned, the position being determined by the position encoder 34 or by some other form of a counter. The solenoid 37 is operated to clamp the carriage in cutting position (FIG. 7), while the roller 32***c* assures a proper distance between the nozzle and the core to be cut. The core is cut by the nozzle while being rotated between the core support rollers 27 and 28. This process is repeated for each section of the core to be severed. The core cutter is then traversed out of operative position, and the cylinder 35 is actuated to cause the roll 27 to pivot about the axis of the roll 28 to the dotted line position shown in FIG. 1, thereby lifting the segmented core 20 out of cutting position and depositing the same in the receiving trough 60 of the transporter section III.

When the roll 70 has attained its desired diameter, the rider roll 77 is retracted, as shown in FIG. 2, and the arms 40 carrying the ejector bar 68 are moved by the first cylinders 44 so as to place the ejector bar into pinching contact with the web on the roll, while continued movement of the bar 68 causes the completed roll to be moved out of the gap between the winding drum 74 and 75 and onto the ramp 76. At this point, the web is ready for severing and taping.

The support arms which carry the severing and taping Section IV may then be operated by the cylinder 85 to bring the section from its normally retracted position as shown in FIG. 1 to its operative position shown in FIGS. 2 and 3, and vacuum applied to the suction box 90 (FIG. 4). Upon signal, the carriage 94 is moved transversely, bringing the knife 100 into shearing engagement with the web at the cutting line 110. At the same time, the dispensers 95 and 96 apply a double sided adhesive strip to the edges of the web which are positioned respectively above and below the cut.

As the carriage 94 nears the end of its travel the roller 125 of the tape applicator 95 will be depressed by a suitable track positioned at the edge of the web thereby rotating the mechanism about the pivot axis of the central drum 121 and causing the pin 140 to cam or lock into the gear 128, to stop further feed of the tape, causing the tape to tear off. This happens simultaneously with respect to both of the tape applicators, which continue then to travel with the carriage to the end of the stroke of the rodless cylinder, where the toggle roller 135 is flipped up to its raised position.

The carriage 94 of the cutting and taping section IV will then remain at its travelled or extended position across the web, and the cylinder 45 is actuated to move the arms 40 and the ejector bar 68 to the position shown in FIG. 3, thus urging the now completed roll 70 further along the ramp, causing the taped tail to be adhered to the roll, and bringing the trough 60 into position between the winding drums 74 and 75. The cylinder 55 may now be actuated to lower the beam 50 downwardly to the lower position as shown in FIG. 3, thereby rotating the trough 60 and dropping the cut core sections into the winder and into a winding position as shown in FIG. 3. After thus depositing the core sections in place, the beam 50 is retracted to its raised position and the arms 40 may be moved back to their initial or start position shown in FIG. 1.

When the core sections are in place between the winding drum they occupy the position generally shown by the phantom or broken lines of FiG. 4. Conventional core chucks, not shown, are moved in laterally to position and hold the cores in place, suction is removed from the suction box 90, and air pressure is applied to the blow tube 93, causing the free taped end of the web 10 to wrap itself about the core sections, as shown in FIG. 3. The individual web components of the slit are transversely aligned with corresponding core sections so that the slit edges of the web corresponds closely with the ends of the core sections.

The rodless air cylinder 85 is now operated to return the carriage 94 and the attached mechanism to its initial position. During the return movement, the pressing roller 115, which has an outer somewhat concaved or core conforming surface, engages the taped end of the web along the tape line and presses the tape against the core sections, thereby adhesively connecting the free ends of the web sections to the newly inserted core sections. When this motion has been completed, the winding section V and slitter section I may be started up again in the conventional manner to form a new roll.

It will be seen that the apparatus of the present invention is designed for minimum down time. By reason of the positioning of the core cutter II behind the web and by reason of the inserting of the cut core sections into the winding drum gap immediately behind the outwardly moving completed roll, the down time is kept to a minimum. Thus, it is not necessary to completely remove the previously wound roll before loading the winder with the new core sections. A further advantage arises in the fact that the core sections themselves are cut at the same width, utilizing the same positioning program, by means of which the slitter itself is positioned, thereby assuring the automatic selection of core sections. A further advantage of the invention resides in the fact that the roll ejector mechanism is also the core transporter and delivers the newly cut core sections into the winding drum cradle from the rear of the machine essentially at the same time the completed roll is being moved out. The web tail has been taped and is secured to the completed roll by the roll ejector immediately after cutting, ready to ship, without any waste of material, while the leading end of the web is taped to the cores immediately after cutting, even while the finished roll is not completely out of the machine.

It is thus seen that the invention further includes the method of converting a web of paper into a completed log or roll by slitting the web into individual web componenents and rewinding these components on corresponding individual sections of a core in a drum type winder. This method includes the steps of selecting and severing a core into individual sections which correspond in length and axial position to the corresponding spacing and placement of the knives on the slitter, which sectioning may be under command of an informational or computer program in common with that of the slitter. A further step includes the transporting of the sectioned core to the drum winder by movement from a position behind a previously wound roll while, at the same time, by using the transporter bar, moving the previously wound roll initially out of its winding position and into a position adjacent the winder, with the web still attached. A further step includes the severing of the web leading from the winder to the previously wound roll, while simultaneously applying adhesive such as by the tape applicators to the tail of the web from the roll and to the lead end of the web at the winder, on either side of the severe or cut line, which step may further include the step of clamping the web during cutting, such as by differential pressure or vacuum.

The wound roll is now moved further out of the winder in the same direction as it was previously moved, and after the adhesive has been applied to the tail end of the web and this motion results in the tacking of the tail end to the roll, thus completing the roll or slit log.

A further step on the method is the depositing by the transporter of the core sections into the drum winder adjacent the taped lead end of the web while maintaining the axial alignment of these sections. Finally, the taped lead end of the web is applied to the core sections for winding with the core sections being in alignment with the web components so that the splits or cuts between the web sections closely correspond to the edges of the web components.

While the method herein described, and the form of apparatus for carrying this method into effect constitute preferred embodiments of the invention, it is to be understood that the invention is not limited to this precise method and form of apparatus, and that changes may be made in either without departing from the scope of the invention.

What is claimed is:

1. A slitter-rewinder system comprising:

a slitter having knives movable into a plurality of preselected transverse positions, a core cutter section comprising means for supporting a core, core cutting means positioned adjacent said core support means and movable transversely into a plurality of preselected positions corresponding to the positions of said slitter knives and operable to cut a core thereon into a plurality of core sections corresponding in length and position to the corresponding transverse spacing and placement of said slitter knives, a pair of winder drums for receiving a slit web from said slitter for winding on a core, transporter means for carrying said core sections from said core support for placement in said winder drums, a combined web cutting and adhesive applying section, including a transverse support positioned adjacent said winder drums, a carriage mounted for movement transversely of said support, said carriage having cutter means for severing said web between said winder drums and a wound roll, said carriage further having adhesive applicator means thereon for applying an adhesive to the trailing end of the web from the roll so that the same may be secured to the roll and for applying adhesive to the lead end of the web for application to a core in winding position on said winder drums.

2. The system of claim 1 further including means for securing the end of said web after adhesive has been applied thereto to said core sections.

3. The system of claim 1 in which said transporter further includes means engageable with a completed roll in said winder for moving the completed roll out of said winder prior to placement of said core sections in said winder.

4. The system of claim 1 in which said core cutting section has core support means, including, a pair of parallel adjacent rolls to receive a core therebetween and support said core during cutting, one of said rolls being mounted for pivotal movement about the other of said rolls to deposit said core sections in said transporter means.

5. The system of claim 1 in which said adhesive applicator means includes a pair of double side tape dispensers positioned respectively above and below the cut line of said cutting means.

6. The system of claim 1 in which said core cutting means includes a water jet nozzle for cutting said core.

7. The system of claim 1 in which said combined web cutting and adhesive applying section includes a transverse suction box for clamping the web during cutting and application of adhesive.

8. The system in claim 1 in which said combined web cutting and adhesive applying section includes a transverse blow tube for wrapping the cut lead end of the web about the core sections in the winder.

9. The system of claim 8 in which said combined web cutting and adhesive applying section includes a roller for pressing the cut lead end of the web into pressure contact with the core sections.

10. The method of converting a web of paper into a roll or log by slitting into individual web components and rewinding the same on corresponding individual sections of a core in a drum type winder comprising the steps of:

severing a core into individual sections which correspond in length and in axial position to the corresponding spacing and placement of the knives of a slitter, transporting said sectioned core to said drum winder from a position behind a previously wound roll while, at the same time, moving said previously wound roll out of winding position, severing the web leading from said winder to said previously wound roll while simultaneously applying adhesive to the tail end of the web from the roll and to the lead end of the web at the winder, continuing to move said wound roll out of said winder after adhesive has been applied to the tail end and for tacking the tail end to the roll, thereafter depositing said core sections in said winder adjacent said lead end while maintaining the axial alignment of said sections, and applying the lead end of said web to said core sections for winding in said winder with said core sections being in alignment with the web components with the splits therebetween corresponding to the edges of said web components.

11. The method of converting a web of paper into a roll or log by slitting into individual web components and rewinding the same on corresponding individual sections of a core in a drum type winder comprising the steps of:

severing a core into individual sections which correspond in length and in axial position to the corresponding spacing and placement of the knives of a slitter, transporting said sectioned core to said drum winder from a position behind a previously wound roll while, at the same time, moving said previously wound roll out of winding position, severing the web leading from said winder to said previously wound roll while simultaneously applying adhesive to the tail end of the web from the roll and to the lead end of the web at the winder, depositing said core sections in said winder adjacent said lead end while maintaining the axial alignment of said sections, and applying the lead end of said web to said core sections for winding in said winder with said core sections being in alignment with the web components with the splits therebetween corresponding to the edges of said web components.

12. The method of converting a web of paper into a roll or log by slitting into individual web components and rewinding the same on corresponding individual sections of a core in a drum type winder comprising the steps of:

severing a core into individual sections which correspond in length and in axial position to the corresponding spacing and placement of the knives of a slitter, moving a previously wound roll out of winding position, transporting said sectioned core to said drum winder from a position behind said previously wound roll, severing the web leading from said winder to said previously wound roll while simultaneously applying adhesive to the tail end of the web from the roll and to the lead end of the web at the winder, continuing to move said wound roll out of said winder after adhesive has been applied to the tail end and for tacking the tail end to the roll, thereafter depositing said core sections in said winder adjacent said lead end while maintaining the axial alignment of said sections, and applying the lead end of said web to said core sections for winding in said winder with said core sections being in alignment with the web components with the splits therebetween corresponding to the edges of said web components.

* * * * *